United States Patent [11] 3,619,033

| [72] | Inventor | Donald H. McMahon |
| | | Carlisle, Mass. |
| [21] | Appl. No. | 762,449 |
| [22] | Filed | Sept. 25, 1968 |
| [45] | Patented | Nov. 9, 1971 |
| [73] | Assignee | Sperry Rand Corporation |

[54] THREE-DIMENSIONAL LIGHT BEAM SCANNER UTILIZING TANDEMLY ARRANGED DIFFRACTION GRATINGS
3 Claims, 6 Drawing Figs.

[52] U.S. Cl. .................................................... 350/162,
350/3.5, 350/7
[51] Int. Cl. ........................................................ G02b 5/18,
G02b 27/38
[50] Field of Search ...................................... 350/3-5,
6-7, 162 SF, 162 ZP; 178/7.6, 7.7

[56] References Cited
UNITED STATES PATENTS
| 1,679,086 | 7/1928 | Jenkins ........................ | 350/6 |
| 1,962,474 | 6/1934 | Baird ........................... | 178/7.6 |
| 3,312,955 | 4/1967 | Lamberts et al. ........... | 350/162 |
| 3,314,052 | 4/1967 | Lohmann .................... | 350/162 |
| 3,410,624 | 11/1968 | Schmidt ..................... | 350/150 |

OTHER REFERENCES
Schwar et al. Nature, Vol. 215, No. 5098, July 1967 pp. 239- 241
Cindrich, Applied Optics, Vol. 6, No. 9, Sept. 1967, pp. 1531- 1534

*Primary Examiner*—David Schonberg
*Assistant Examiner*—Ronald J. Stern
*Attorney*—S. C. Yeaton

ABSTRACT: A light beam scanning apparatus including a rotatable disc having a plurality of focusing elements disposed in an annular or spiral pattern such that an impinging light beam is intercepted in succession by each of the focusing elements and deflected along a plurality of adjacent lines thereby providing, in accordance with the characteristics of the focusing elements, either a two-dimensional scan pattern oriented respectively transverse or parallel to the direction of the focused light or alternatively a three-dimensional scan pattern encompassing the areas of the orthogonal two-dimensional patterns.

PATENTED NOV 9 1971

INVENTOR
DONALD H. MC MAHON
BY
*S. C. Yeaton*
ATTORNEY

INVENTOR
DONALD H. MC MAHON
BY
ATTORNEY

INVENTOR
DONALD H. MC MAHON
BY
ATTORNEY

THREE-DIMENSIONAL LIGHT BEAM SCANNER UTILIZING TANDEMLY ARRANGED DIFFRACTION GRATINGS

BACKGROUND OF THE INVENTION

The present invention relates to light beam scanning devices and more particularly to improved means for scanning a light beam over a given area or volume.

Heretofore, to scan a light beam in more than one dimension, the number of components required has been directly related to the number of dimensions to be scanned. In the case of conventional mechanical devices, for example, a light beam may be scanned in a line-by-line fashion over a given area by reflecting the light from two mirrors oscillating or rotating about orthogonal axes, the motion of the mirrors being synchronized so that one mirror scans the beam along a linear path while the other mirror adjusts the location of the successive line scans in a direction perpendicular thereto. Likewise, in the case of two electro-optic light beam deflectors arranged in tandem, the first member deflects the beam in one direction and the second member deflects it in an orthogonal direction to perform a two-dimensional scan. In addition to the complexity arising from the necessity for several individual scanning components and the provision of synchronization therebetween, another limitation of prior art two-dimensional scanners is that they cannot be easily adapted to three-dimensional scanning.

SUMMARY OF THE INVENTION

The present invention overcomes the aforementioned limitations of the prior art devices by the provision of an electromechanical apparatus capable of scanning a light beam in either two or three dimensions by means of simple rotational motion of a single component. In a preferred embodiment of the invention, a disc having a plurality of diffraction gratings disposed in contiguous relationship about an annular band is rotated in a plane transverse to an incident laser beam. Each grating comprises an array of uniformly spaced lines exhibiting alternately greater and less transmissivity and/or phase retardation to the laser beam, and the plurality of gratings are arranged in the annular band such that the successive gratings have uniformly decreasing line spacing. Thus, as the disc rotates, each grating produces a first order diffraction lobe in which the light is focused at a point in back of the disc such that it scans in an arcuate path as the grating traverses the light beam. Since each grating has a slightly different line spacing, the successive line scans are slightly displaced from one another with the result that the successive beams scan a two-dimensional area oriented normal to the direction of the focused beam. Scanning of an area oriented parallel to the direction of light propagation or scanning of a given volume in space can also be performed with the aforedescribed device. This is preferably accomplished by controlling the convergence or divergence of the beams used in forming the diffraction grating by means of holographic techniques as will be explained more fully in the subsequent description of the preferred embodiments of the invention. In any case, the individual gratings can be arranged or modified in a manner to produce interlaced scanning lines, if desired.

DESCRIPTION OF THE PREFERRED EMBODIMENTS

Figure 1:
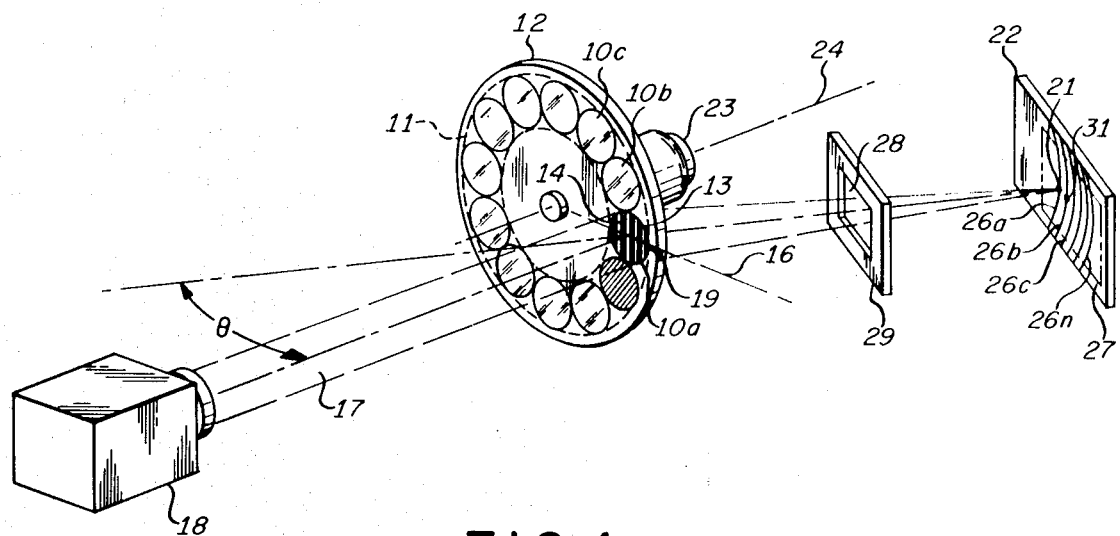
FIG. 1 is a perspective view of a preferred embodiment of a two-dimensional scanner constructed in accordance with the principles of the present invention.

Referring to FIG. 1, a plurality of diffraction gratings 10a, 10b, 10c...10n, are disposed in contacting relation around annular band 11 on disc 12, the $n^{th}$ grating being the last of any desired number that can be physically located on a disc of given size. Each grating comprises a multiplicity of substantially parallel uniform lines 13 and 14 having alternately different light transmission characteristics for affecting the amplitude or phase of the light incident thereon. Amplitude control can be achieved, for example, by lines which are respectively transparent and opaque whereas phase can be controlled by lines having different indices of refraction. Each grating also has a discrete line spacing, that is, an individually distinct number of lines exist across a diameter of each grating, and the gratings are arranged on the disc so that, in proceeding around the annular band in one direction or the other from a given reference point, the line spacing of the respective gratings gradually increases or decreases. Thus, for the position of the disc illustrated in the figure, grating 10a, which has the smallest number of lines across its diameter, is centered on reference line 16 and the line spacing of the gratings decreases in a counterclockwise direction around the annular band.

A collimated reference light beam 17 emitted from laser 18 impinges on area 19 lying in the plane of disc 12, whereupon one first order diffraction lobe is focused by the grating to a point 21 on screen 22. Motor 23 is connected to the disc to rotate it in a clockwise direction about axis 24 causing the respective gratings to pass successively through reference beam 17. This action deflects the focused energy in the diffraction lobe along a plurality of parallel curved lines 26a, 26b, 26c0.26n to provide a line-by-line scan of the area enclosed in dashed line 27 on screen 22. Aperture 28 in mask 29 positioned immediately behind the disc operates to block part of the light passing through the gratings to assure that only one focused beam scans the dashed line enclosed area on the screen at any given time. This is accomplished by arranging the mask such that when the reference beam overlaps two adjacent gratings by equal amounts, one grating directs the scan beam to the top of the aperture and the other grating directs it to the bottom. The diameter of the reference beam is preferably made slightly less than the diameter of the gratings, however, to minimize overlap of the beam on contiguous gratings and to improve the efficiency of the scanning mechanism. The curvature of the scan lines decreases as the number of scan lines increases in correspondence with a reduction in the diameter of the individual gratings. It has been found that only slight curvature exists when 50 scan lines are produced and it is believed that the curvature will not be detectable to the human eye when the number of scan lines numbers 200 or more.

The scan lines are vertically oriented as a result of the gratings being positioned on the disc in a manner whereby the grating lines are substantially vertical as each grating passes through the reference beam. Other orientations of the scan lines can be used, though, as will become apparent from the following description which explains how the two-dimensional scan is produced. As previously mentioned, when grating 10a is centered in the path of the reference beam it focuses the light in the first order diffraction lobe to point 21 on screen 22. On the other hand, when grating 10b which has a line spacing slightly less than grating 10a is centered in the path of the reference beam, the light is focused to point 31. Likewise, when each additional grating of successively smaller line spacing is positioned in the aforesaid manner, it focuses the light to successive points displaced at increasing distances to the right of point 31. For similar gratings having horizontally disposed lines it will be appreciated that the corresponding diffraction lobes would be deflected upward to a series of points located in a vertically oriented plane.

Now consider how an individual scan line is generated. As the disc rotates causing grating 10a to leave the path of the reference beam and grating 10b to enter into it, the light energy is initially focused on the screen at the top of line 26b and then scans along line 26b until grating 10b leaves the path of the reference beam and grating 10c moves into it to commence a scan along line 26c. The scans result from the fact that each grating is rotated slightly as it traverses the reference beam causing the diffracted light to be deflected above and below the horizontal plane including center pointers 21 and 31. The operation continues in this manner until the grating of smallest line spacing crosses the reference beam to produce scan line 26n and thereafter the procedure is repeated commencing with scan line 26a. As indicated in the figures the scan lines are slightly curved. This results from the slight rotation of the gratings in moving across the reference beam.

The diffraction gratings used on the disc may be constructed by conventional ruling techniques but to obtain closely spaced scan lines the line spacing on the successive gratings must vary by only a slight amount, one grating having, for example, 1,000 lines per inch, the next 1,001 or 1,002 lines and so on, increasing by only a small amount from grating to grating. Conventional methods are not readily adaptable for constructing gratings with the required line spacing and therefore it has been found more practical to make the gratings by means of holographic techniques. This can be accomplished with the apparatus depicted in FIG. 2 wherein a laser beam 32 is divided by beam splitter 33 by reflection and transmission therethrough of equal intensity signal and reference beams 34 and 36 respectively. The reference beam is reflected from mirror 37 directly onto disc 12 which is rotated about axis 24 by motor 23. The signal beam reflects from mirror 38 through lenses 39 and 41 onto disc 12 at an angle $\alpha$ with respect to the reference beam. The signal and reference beams thus combine on the disc, which is a transparent substrate constructed of glass coated with a fine-grain photographic emulsion such as Kodak 649F, to form an interference pattern that can be used as a diffraction grating in the scanning apparatus of FIG. 1. The interference pattern will have vertically oriented fringes with a circular outline as shown in FIG. 1 if the laser beam is collimated and circular in cross section and the signal and reference beams lie in a horizontal plane. In addition, if the light beams are collimated or converge or diverge at approximately the same angle, the grating lines will be substantially straight and parallel to one another. To produce a grating of different line spacing, the motor is energized to rotate the disc an incremental distance equal to the size of the beams while both of the beams are blocked from the disc. At the same time, lens 39 is translated horizontally normal to the direction of the signal beam. This causes the signal beam once again to overlap the reference beam but to impinge on the disc at a different angle than it did previously so that it interacts with the reference beam to produce a diffraction grating of different line spacing. The foregoing procedure is repeated until the desired number of gratings have been produced on the disc.

Figure 2:
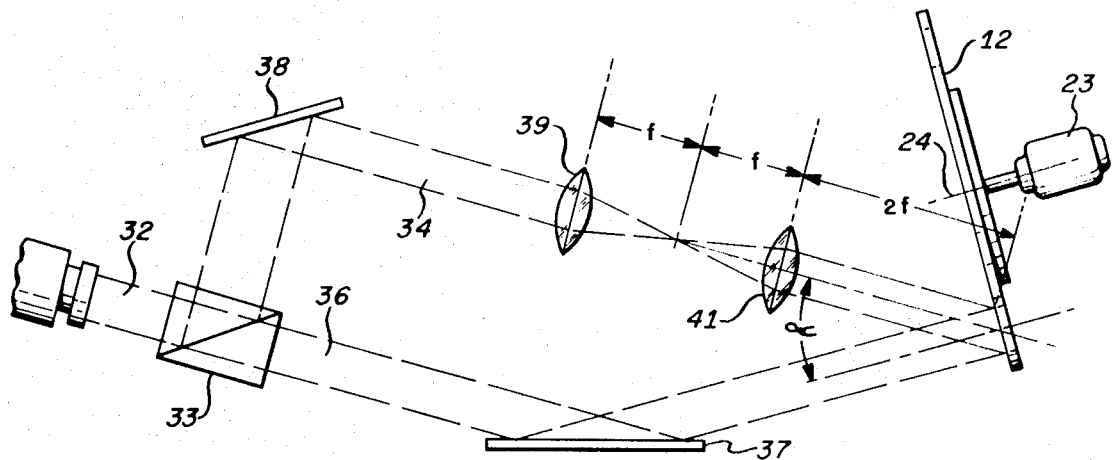
FIG. 2 is a plan view of an apparatus for constructing holographic diffraction gratings for use in the apparatus of FIG. 1.

A short focal length scanning apparatus, that is, one which focuses the scanned beam at a point comparatively close to the rotating disc, can be provided by modifying the apparatus depicted in FIG. 2 in the following manner. In place of lenses 39 and 41 substitute a microscope objective and stop and position an iris in front of the disc. Then the signal beam will be focused at a point between the objective and the disc and diverge therefrom to strike the disc along with the reference beam. The successive gratings are produced by moving the objective and stop by corresponding increments in a direction normal to the signal beam. The iris is adjusted so that only those portions of the reference and signal beams which overlap for all positions of the microscope objective are permitted to strike the disc. After the gratings have been produced in the foregoing manner, a scanning beam can be generated by illuminating the disc with a reference beam incident on the disc from a direction opposite to that shown in FIGS. 1 and 2. This causes the signal beam to be reconstituted at the point at which it was focused by the microscope objective during the process of constructing the holographic gratings.

The gratings are classified as either absorption or phase holograms. An absorption hologram produces the scanning diffraction lobe by selective absorption of the reference beam whereas in a phase hologram the scanning beam is produced by a corrugated phase retardation effect. Phase holographs have been successfully produced by bleaching the exposed and developed film with Kodak R-10 bleach or Kodak Chromium Intensifier bleach. It has been found, however, that these phase holograms darken after being illuminated with high-intensity blue, violet or ultraviolet light but this effect can be reversed by subsequent bleaching.

The efficiency of the scanning apparatus, as measured by the ratio of the light power in the incident reference beam, is determined by the characteristics of the gratings. In general, where the gratings are made by holographic techniques, the efficiency is enhanced if thick films are used, a thick film being one in which the interference pattern is produced by reference and signal beams incident on the film at an angular separation of approximately 2° or more, whereupon the line spacing of the recorded pattern is small compared to the thickness of the photographic emulsion, about 15 microns for Kodak 649F spectroscopic plate. In the case of thin-film holographic gratings, the reference and signal beams are separated by angles less than 2° so that the resulting interference pattern has a relatively large line spacing compared to the thickness of the photographic emulsion. Although thin-film gratings are suitable for use in the scanner mechanism, best results have been obtained using thick films constructed with angles of 30° to 45° between the reference and signal beams and with the reference beam oriented normal to the disc. Phase holograms providing efficiencies up to 60 percent have been produced and improved techniques should provide efficiencies closer to the theoretical maximum of 100 percent.

The number of resolvable beam positions in the areal scan is determined by the width of the illuminated portion of the grating, the wavelength of the light and the angular displacement ($\theta$) of the real image (the first order diffraction lobe) from a normal to the disc. This can be verified by the following simplified analysis. Referring to FIG. 1, a single scan line is produced when the disc rotates through an angle $\Phi = A/r$ where $A$ is the diameter of the grating and $r$ is the radial distance from the center of the disc to the center of the grating. The length of the scan line is equal to $R\Phi$ or $RA/r$ where $R$ is the distance between the focused spot and the axis of the reference beam measured normal thereto. Since $R$ is equal to $f \sin \theta$ where $f$ is the focal length of the diffraction grating, the length of the scan line is equal to $fA \sin \theta / r$. From elementary diffraction theory, the diameter ($D$) of the focal spot is approximately equal to $f\lambda/A$ where $\lambda$ is the wavelength of the light. The number of resolvable beam positions per scan line ($B_L$) is therefore the scan line length divided by the focal spot size, or $A^2 \sin \theta / r\lambda$. The number of scan lines ($N$) is determined by the number of gratings on the disc, which in the case of gratings in contacting relationship on a disc of radius $r$ to the center of the gratings is equal to $2\pi r/A$. Thus, the total number of resolvable bits in the scan is the product of the number of scan lines ($N$) and the number of resolvable beam positions per line ($B_L$) or $2\pi A \sin \theta / \lambda$. For a grating diameter of one-half centimeter and a wavelength of $6\times10^{15}$ centimeter and assuming $\sin \theta = 1$, the number of resolvable beam positions becomes $0.5 \times 10^5$. The resolution may be increased, however, by constructing the grating in the form of a radially extending trapezoidally shaped slit. If the radial and angular dimensions of the slit are labeled $h$ and 2, respectively, then the number of the resolvable beam positions per scan line becomes $h w \sin \theta / r\lambda$ and the number of scan lines becomes $2\pi r/w$ with the result that the number of resolvable bits in the area scan is $2\pi h \sin \theta / \lambda$. Hence, if the radial dimension ($h$) of the slit is enlarged to four centimeters while the other parameters remain at the aforementioned values, the number of bits will increase to $4\times10^5$, the same as in a standard television raster. Holographic gratings having a trapezoidal shape may be constructed by using cylindrical lenses at appropriate locations in the apparatus of FIG. 2 as will be apparent to those skilled in the art.

The preceding paragraphs have described an apparatus capable of scanning a light beam over a given area oriented transverse to the direction of light propagation. The holographic diffraction apparatus is also capable, however, of scanning an area parallel to the direction of propagation of the diffracted light, that is, of providing depth of field scanning and is, in fact, particularly suitable both for this purpose and for three-dimensional scanning which will be described subsequently. Depth of field scanning can be achieved by using a different procedure for establishing the holographic interference pattern in the system of FIG. 2. If the holograms are produced with one of the light beams, for instance the signal beam, either converging or diverging while the reference beam is collimated and then the scanning diffraction lobe is generated with a collimated reference beam, the focal length of the scanning beam will be the same as the focal distance of the signal beam used in making the hologram. Thus, if in using the apparatus of FIG. 2 the signal beam is adjusted to converge or diverge at a different angle for recording each holographic diffraction grating that is used in the embodiment of FIG. 1, then a two-dimensional depth of field scan will be generated when a collimated reference beam impinges on the gratings. Each holographic diffraction grating constructed in this manner effectively constitutes a portion of a zone plate. Alternatively, the individual scan lines can be focused at different distances by making the wave front curvature of the reference beam used for generating the scanning diffraction lobe different from that used in recording the respective hologram. The preferred method for achieving depth of field scanning, however, is to vary the convergence of the signal beam in recording each hologram because then, in playback, when the reference beam strikes the respective gratings, the signal beams will be reconstituted with their corresponding focal lengths.

Figure 3:
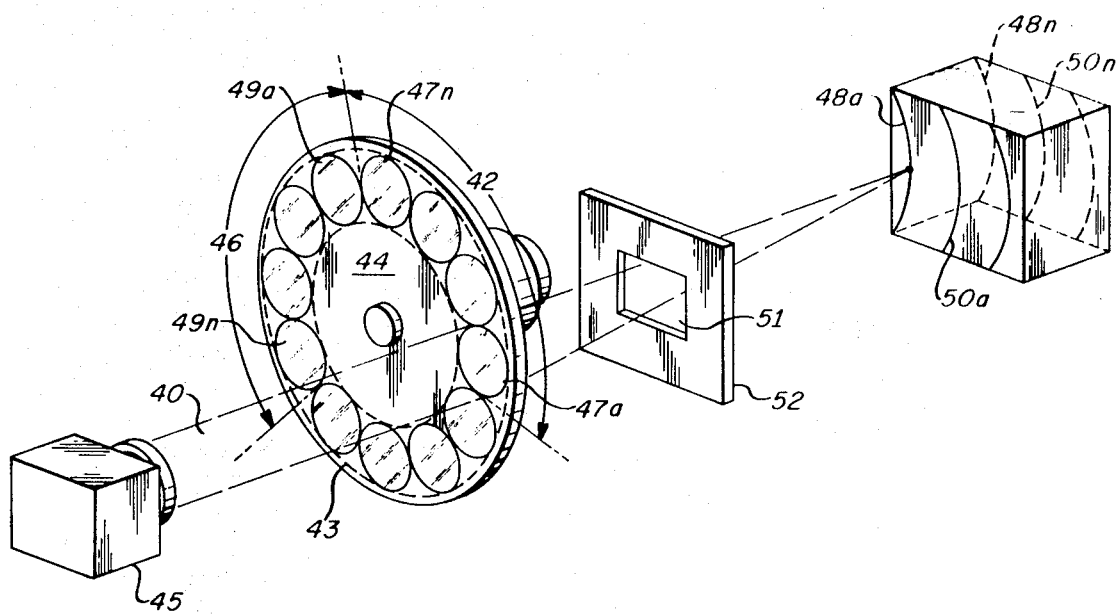
FIG. 3 is a perspective view of a three-dimensional scanning apparatus embodying the concept of the present invention.

The most significant aspect of the depth of field scanning capability of the holographic gratings relates to their adaptability to three-dimensional scanning. An apparatus for generating a three-dimensional scanning pattern will now be described with reference to FIG. 3 wherein the gratings 47a to 47n in arcuate section 42 of annular band 43 on disc 44 sweep light beam 40 from source 45 along a first sequence of vertical scan lines 48a to 48n at successively increasing distances from disc 44. In like manner, gratings 49a to 49n in arcuate section 46 provide a second similar sequence of scan lines 50a to 50n oriented parallel to the corresponding lines of the first sequence. The remaining groups of gratings in successive arcuate sections around annular band 43 provide additional depth of field line scans parallel to the lines of the first and second sequences and thereby scan a given spatial volume. Aperture 51 in mask 52 assures that only a single scan line is formed at any given instant. It should be understood that the number of resolvable beam positions for this volume scanning apparatus and the aforedescribed two-dimensional depth of field scanning apparatus will be the same as explained for the two-dimensional transverse scanning apparatus of FIG. 1.

Figure 4:
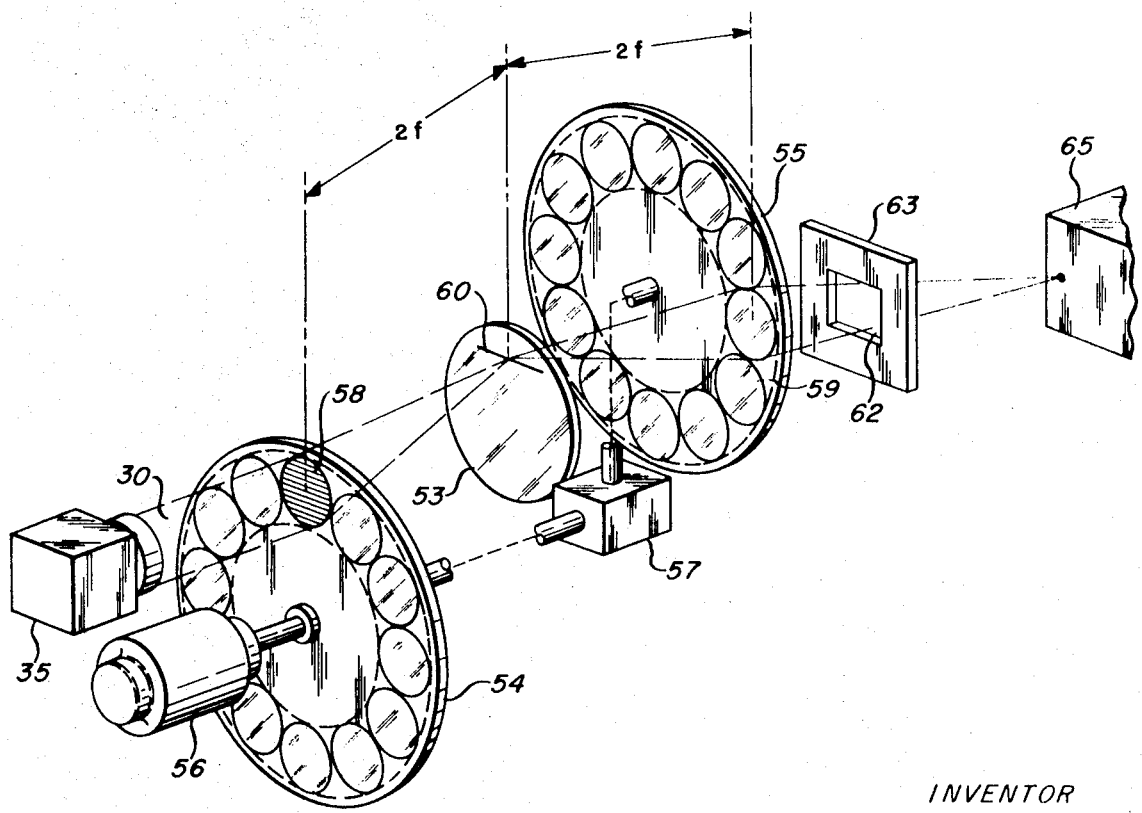
FIG. 4 is a perspective view of an alternative embodiment of a three-dimensional scanning apparatus.

Referring to FIG. 4, a three-dimensional scanner of substantially increased resolution comprises lens 53 positioned intermediate discs 54 and 55 which are both separated from the lens by a distance equal to twice its focal length. More generally, the lens and discs must be arranged such that disc 55 is located in the plane at which the lens forms an image of disc 54. Motor 56 connects directly to disc 54 and through gear unit 57 to disc 55 to rotate the discs in a synchronized fashion such that disc 54 rotates through a prescribed number of complete revolutions for a single revolution of disc 55. A plurality of gratings are disposed in contiguous relationship around an annular band on each of the discs. The gratings 58 on disc 54 are all identical so as to produce a repetitive horizontal line scan. The gratings 59 on disc 55 are constructed in accordance with the method previously described for producing two-dimensional depth of field scanning. In operation, part of the energy in collimated light beam 30 emitted from laser 35 is diffracted upward by the gratings on disc 54 and focused on lens 53 such that it repetitively scans along horizontal line 60. Placement of the lens in the aforedescribed manner with respect to the discs assures that, irrespective of the position of the light energy focused on the lens, the energy transmitted therethrough is always directed onto a given area lying in the plane of disc 55, the given area preferably being slightly smaller than the dimensions of the gratings. As a result, the light beam impinges on disc 55 at varying angles of incidence in accordance with the position of the energy focused on lens 53. Since the individual gratings on disc 55 are constructed and arranged to generate a discrete vertical scan line as each grating traverses the beam and the succession of gratings produces a series of such scan lines at successively greater distances from the disc, it will be appreciated that if disc 54 makes one revolution during the time that a single grating on disc 55 is crossing the light beam incident thereon, then a three-dimensional scan will be provided. Aperture 62 in mask 63 once again assures that only a single scan line is displayed at any given time.

The scanning mechanisms provided by the present invention have a comparatively large $f$ number because of the small area of the gratings as compared to their focal distance. The high $f$ number corresponds to a slowly converging beam, which causes a loss of resolution in a direction parallel thereto. This interferes with proper viewing since the beam intercepts only one eye at a time. Consequently, the three-dimensional scans are preferably directed into a diffusive scattering medium 65 such as a colloid suspended in solution so that the display can be viewed indirectly rather than directly as in the case of two-dimensional transverse scanning.

Figure 5:
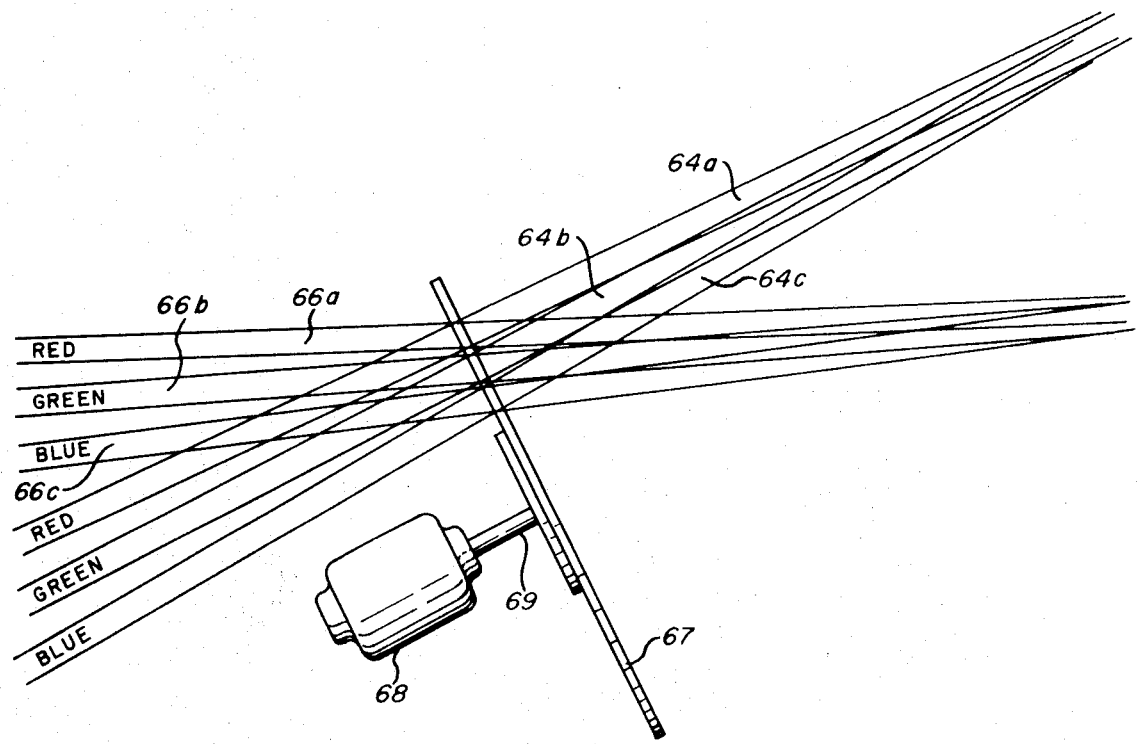
FIG. 5 is a plan view of an apparatus for constructing holographic diffraction gratings for use in a color scanning system.

A color scanning device based on the principles of the present invention can be obtained by constructing the holographic gratings with the apparatus shown in FIG. 5 wherein the three reference beams 64a, 64b and 64c and three signal beams 66a, 66b and 66c comprising the primary colors red, green and blue, respectively, are directed onto disc 67 such that the respective colors overlap each other, that is, red-on-red, green-on-green and blue-on-blue, in adjacent relationship along a radius of the disc. In forming the interference patterns between the respective colors or light beams of discrete wavelength the reference and signal beams are aligned so that the discrete wavelength constituents are incident on the disc at a common angle $\psi$ therebetween. The next grating is formed by energizing motor 68 to rotate the disc an incremental amount about axis 69 passing through the center of the disc and changing the angle of incidence of the center beams upon the disc by means of a lens arrangement as was explained for the single-color system shown in FIG. 2. Thereafter, a two-dimensional color display oriented transverse to the direction of light propagation can be provided simply by illuminating the disc at the same points and at the same angle of incidence with three reference beams having the same wavelength and wave front curvature as was used in making the respective gratings. In this way, the three diffraction lobes of different color will be focused onto the same point at any given time. This, the color of the display at each resolvable position can be controlled by appropriate gating and amplitude control of the three reference beams.

Figure 6:
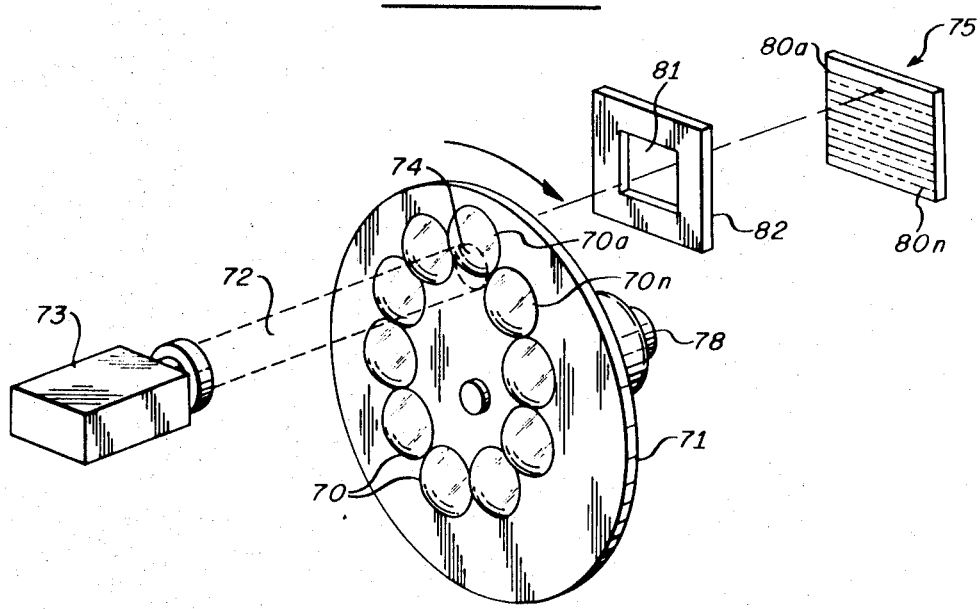
FIG. 6 is a perspective view of an alternative embodiment of a two-dimensional scanning apparatus.

An alternative embodiment for providing a two-dimensional single color scan oriented transverse to the direction of light propagation is shown in FIG. 6 wherein a plurality of molded lenses 70a to 70n are positioned on transparent disc 71 in a spiral array. The lenses are constructed with a flat surface on one side in order to be adaptable for connection to the disc by some convenient means such as taping or gluing. A collimated light beam 72 emitted from light source 73 illuminates area 74 lying in the plane of the disc and is focused by lens 70a to a point 75 on screen 77 for the position of the disc shown in the figure. As motor 78 rotates the disc in a clockwise direction, lenses 70a to 70n sweep the focused light from left to right across lines 80a to 80n. Light beam 72 in this instance must have a cross section slightly larger than the individual lenses or alternatively must be centered on a point lying on the median radial distance of the plurality of lenses from the center of the disc. Aperture 81 in mask 82 functions as in the previously described devices to permit only one scan line to impinge on the screen at any given time. This device is preferred for its simplicity of construction but is limited to low resolution applications as a result of various aberrations in the lenses. High resolution equivalent to that provided by the diffraction gratings could be obtained only by using microscope objective quality lenses, that is, lenses constructed from an appropriate combination of several lenses.

While a laser source has been stipulated in all of the embodiments it is to be understood that other light sources may also be used but will be accompanied by a degradation of efficiency and resolution.

While the invention has been described in its preferred embodiments, it is to be understood that the words which have been used are words of description rather than limitation and that changes within the purview of the appended claims may be made without departing from the true scope and spirit of the invention in its broader aspects.

I claim:

1. A three-dimensional light beam scanner comprising:
   a first disc having a plurality of diffraction gratings disposed thereon in a circular band,
   a light source providing a beam of light directed onto a fixed region located in the plane of the circular band on said first disc occupied by only one of said gratings,
   a second disc having a plurality of diffraction gratings disposed thereon in a circular band and positioned relative to said first disc such that the light diffracted by said first disc is incident on a fixed region in the plane of the circular band occupied by only one of said gratings on said second disc,
   means for synchronously rotating said first and second discs at different rotational rates about axes passing through the center of said circular bands,
   the gratings on one of said first and second discs being identical uniform straight line gratings so that the light incident thereon is repetitively scanned in a single direction as the gratings traverse the light,
   each grating on the other of said first and second discs being portions of different zone plates each having a discrete focal length so as to focus the incident light at individually distinct distances from said other disc and oriented on said other disc relative to the incident light as to be operative in the course of rotating to additionally scan the light in a direction transverse to the scanning direction provided by said one disc, and
   mask means having an aperture for blocking all the light coming from said second disc except for the desired portion diffracted by the gratings on said second disc.

2. The apparatus of claim 1 further including a lens positioned in the path of the light beam intermediate said discs for forming at said fixed region in the plane of the circular band of said second disc an image of the respective gratings on said first disc at the instant each grating thereof is in said fixed region in the plane of the circular band of said first disc.

3. The apparatus of claim 2 wherein the lens is positioned at a distance of twice its focal length from both of said discs.

* * * * *